(12) United States Patent
Kajita

(10) Patent No.: US 7,044,016 B2
(45) Date of Patent: May 16, 2006

(54) BALL SCREW

(75) Inventor: Toshiharu Kajita, Gunma (JP)

(73) Assignee: NSK Ltd., Tokyo (JP)

( * ) Notice: Subject to any disclaimer, the term of this patent is extended or adjusted under 35 U.S.C. 154(b) by 151 days.

(21) Appl. No.: 10/331,654

(22) Filed: Dec. 31, 2002

(65) Prior Publication Data

US 2003/0126937 A1    Jul. 10, 2003

(30) Foreign Application Priority Data

Jan. 8, 2002    (JP)    ............... P.2002-001525

(51) Int. Cl.
  *F16H 1/24*    (2006.01)
  *F16H 55/02*   (2006.01)
  *F16H 27/02*   (2006.01)
  *F16H 19/00*   (2006.01)

(52) U.S. Cl. ............... 74/424.75; 74/424.71; 74/89.23; 384/450; 384/520

(58) Field of Classification Search ............ 74/424.75, 74/89.23, 424.71, 424.81, 424.82; 384/520, 384/521, 450
See application file for complete search history.

(56) References Cited

U.S. PATENT DOCUMENTS

| | | | | |
|---|---|---|---|---|
| 1,704,031 | A | * | 3/1929 | Boehm ............... 74/424.82 |
| 3,053,105 | A | * | 9/1962 | Cole ............... 74/424.86 |
| 3,244,022 | A | * | 4/1966 | Wysong, Jr. ............ 74/424.75 |
| 4,638,548 | A | * | 1/1987 | Miller ............... 29/558 |
| 4,760,635 | A | * | 8/1988 | Miller ............... 29/558 |
| 5,456,538 | A | | 10/1995 | Honda et al. |
| 5,615,955 | A | * | 4/1997 | Namimatsu et al. ......... 384/13 |
| 5,749,265 | A | * | 5/1998 | Namimatsu et al. ..... 74/424.75 |
| 5,782,563 | A | | 7/1998 | Muto et al. |
| 6,082,210 | A | * | 7/2000 | Ise ............... 74/424.83 |
| 6,176,149 | B1 | * | 1/2001 | Misu ............... 384/45 |

FOREIGN PATENT DOCUMENTS

| | | | |
|---|---|---|---|
| JP | 2001-263446 | * | 9/2001 |
| JP | 2001-317605 | * | 11/2001 |
| JP | 2002-188705 | * | 7/2002 |
| JP | 2004-36744 | * | 2/2004 |

OTHER PUBLICATIONS

Patent Abstracts of Japan, vol. 0103, No. 57 (M-540), Dec. 2, 1986.

* cited by examiner

*Primary Examiner*—Richard W. Ridley
*Assistant Examiner*—Colby Hansen
(74) *Attorney, Agent, or Firm*—Sughrue Mion, PLLC

(57) ABSTRACT

A ball screw having: a screw shaft having a spiral ball rolling groove; a ball nut having a ball rolling groove corresponding to the ball rolling groove; and a large number of balls interposed between the ball rolling grooves so as to roll freely; wherein the ball rolling groove of at least one of the screw shaft and the ball nut is ground so that a maximum value component of a number of undulation peaks per lead in the ball rolling groove is not in a range of from 0.95 nm to 1.05 nm centered on an integral multiple nm of a number m of load balls per lead calculated by an expression:

$$\frac{\sqrt{(\pi d_m)^2 + L^2}}{P}$$

in which P is a distance between centers of the adjacent load balls disposed at substantially equal intervals in the ball rolling groove, $d_m$ is a ball pitch circle diameter, and L is a lead.

5 Claims, 3 Drawing Sheets

RESULT OF MEASURMENT OF BALL ROLLING
GROOVE OF BALL SCREW

BALL SCREW

BACKGROUND OF THE INVENTION

1. Field of the Invention

The present invention relates to a ball screw for transforming rotational motion into linear motion or transforming linear motion into rotational motion.

2. Description of the Related Art

A ball screw includes: a screw shaft having a spiral ball rolling groove formed in its outer peripheral surface; a ball nut having a spiral ball rolling groove formed in its inner peripheral surface in accordance with the spiral ball rolling groove of the screw shaft; and a large number of balls disposed in a spiral space formed by the two spiral ball rolling grooves so as to be able to roll.

When the screw shaft and the ball nut are rotated relatively to each other, the screw shaft and the ball nut move relatively to each other spirally, smoothly and accurately through rolling of the large number of balls while the balls circulate in a ball circulation path provided in the ball nut.

The ball rolling grooves are generally formed by thread grinding finish. The thread grinding process has a tendency to increase periodic machining error (undulation) in a finished surface due to whirling of a grindstone compared with a cylindrical grinding or annular grooving process.

When the distance between undulation peaks on each ball rolling groove 1 does not coincide with the distance between the load balls 2 as shown in FIG. 5A, the influence of machining error on relative motion can be however suppressed by an error averaging effect regardless of more or less machining error on each ball rolling groove 1 because the large number of load balls 2 bear the load imposed on the ball screw.

When the distance between undulation peaks on each ball rolling groove 1 coincides with the distance between the load balls 2 (or a value obtained by dividing the distance by an integer) as shown in FIG. 5B, the averaging effect is however spoiled so that the relative motion is directly influenced by more or less machining error (undulation) on the ball rolling groove 1. Hence, there is a problem that the machining error may cause incidence of vibration or noise.

It is therefore necessary to finish the ball rolling groove 1 in the ball screw accurately to make machining error (undulation) sufficiently small. There is however a problem that this may have large influence on productivity and production cost.

SUMMARY OF THE INVENTION

Paying attention to the fact that the averaging effect is spoiled when the distance between undulation peaks on each ball rolling groove coincides with the distance between load balls (or a value obtained by dividing the distance by an integer), an object of the invention is to provide a ball screw in which the problem of vibration and noise can be solved by fulfilling the averaging effect of the ball screw without giving any influence on productivity and production cost.

In order to achieve the object, according to a first aspect of the present invention, there is provided a ball screw having: a screw shaft having a spiral ball rolling groove on an outer peripheral surface thereof; a ball nut having a ball rolling groove corresponding to the ball rolling groove of the screw shaft on an inner peripheral surface thereof; and a large number of balls interposed between the ball rolling groove of the ball nut and the ball rolling groove of the screw shaft so as to roll freely; wherein the ball rolling groove of at least one of the screw shaft and the ball nut is ground so that a maximum value component of a number of undulation peaks per lead in the ball rolling groove is out of a range of from 0.95 nm to 1.05 nm centered on an integral multiple nm of a number m of load balls per lead calculated by an expression:

$$\frac{\sqrt{(\pi d_m)^2 + L^2}}{P}$$

in which P is a distance between centers of the adjacent load balls disposed at substantially equal intervals in the ball rolling groove, $d_m$ is a ball pitch circle diameter, and L is a lead.

In the ball screw as set forth in the first aspect, according to a second aspect, the grinding of the ball rolling groove is performed in such a manner that a ratio of a rotational speed $N_G$ of a grindstone with respect to a rotational speed $N_W$ of a workpiece is selected so that the maximum value component of the number of undulation peaks per lead in the ball rolling groove is out of a range of from 0.95 nm to 1.05 nm centered on the integral multiple nm of the number m of load balls per lead.

According to a third aspect of the present invention, there is provided a ball screw having: a screw shaft having a spiral ball rolling groove on an outer peripheral surface thereof; a ball nut having a ball rolling groove corresponding to the ball rolling groove of the screw shaft on an inner peripheral surface thereof; a large number of balls interposed between the ball rolling groove of the ball nut and the ball rolling groove of the screw shaft so as to roll freely; and retaining pieces interposed between the balls; wherein the ball rolling groove of at least one of the screw shaft and the ball nut is ground so that a maximum value component of a number of undulation peaks per lead in the ball rolling groove is out of a range of from 0.95 nm to 1.05 nm centered on an integral multiple nm of a number m of load balls per lead calculated by an expression:

$$\frac{\sqrt{(\pi d_m)^2 + L^2}}{P}$$

in which P is a distance between centers of adjacent ones of the load balls disposed in the ball rolling groove so that each of the retaining pieces is sandwiched between the adjacent load balls, $d_m$ is a ball pitch circle diameter, and L is a lead.

According to this configuration, the machining condition for finishing the ball rolling groove of at least one of the screw shaft and the ball nut is controlled to select the number of undulation peaks produced by machining so that the distance between the undulation peaks is set not to coincide with the distance between the load balls (or a value obtained by dividing the distance by an integer) decided in advance according to the design. In addition, the averaging effect of the ball screw is fulfilled so that both vibration and noise can be reduced without giving any influence on productivity and production cost.

DETAILED DESCRIPTION OF THE PREFERRED EMBODIMENTS

An embodiment of the invention will be described below with reference to the drawings.

Figure 1A:
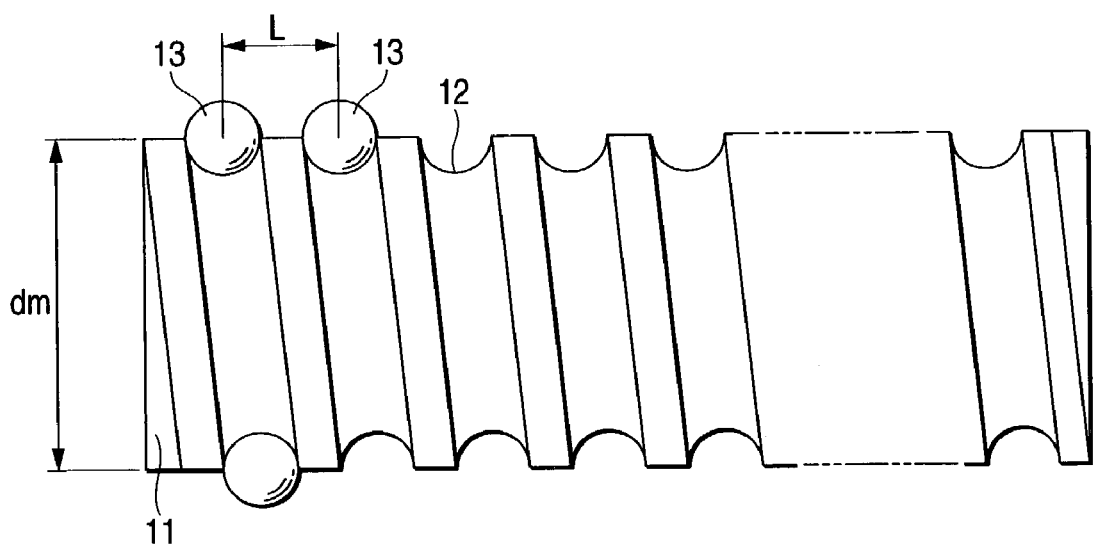
FIG. 1A is a side view of a screw shaft of a ball screw showing a first embodiment of the invention.
Figure 1B:
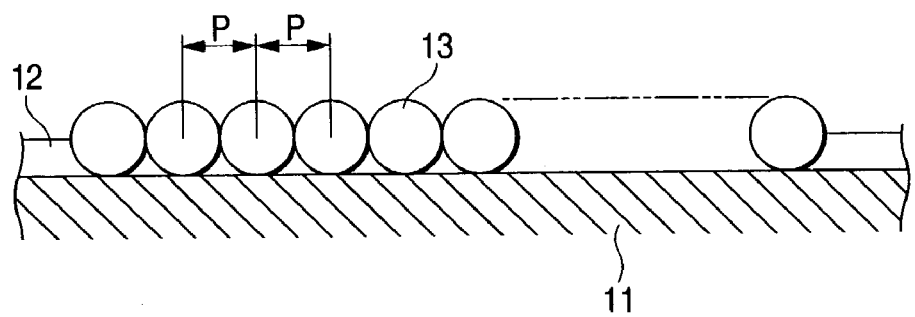
FIG. 1B is a side view showing a state of arrangement of a ball rolling groove in this embodiment.
Figure 2A:
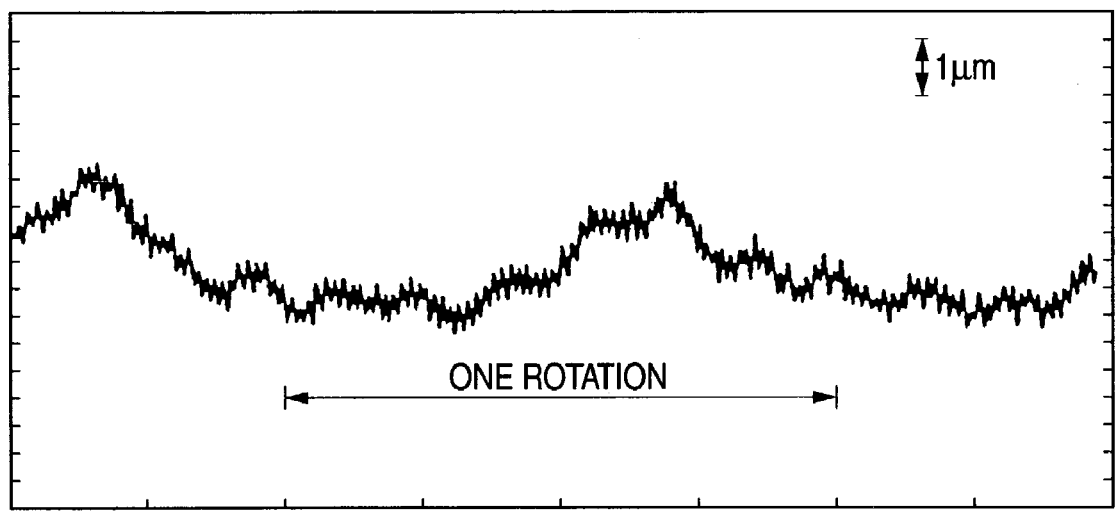
FIG. 2A is a graph showing a result of measurement of the ball rolling groove in the ball screw.
Figure 2B:
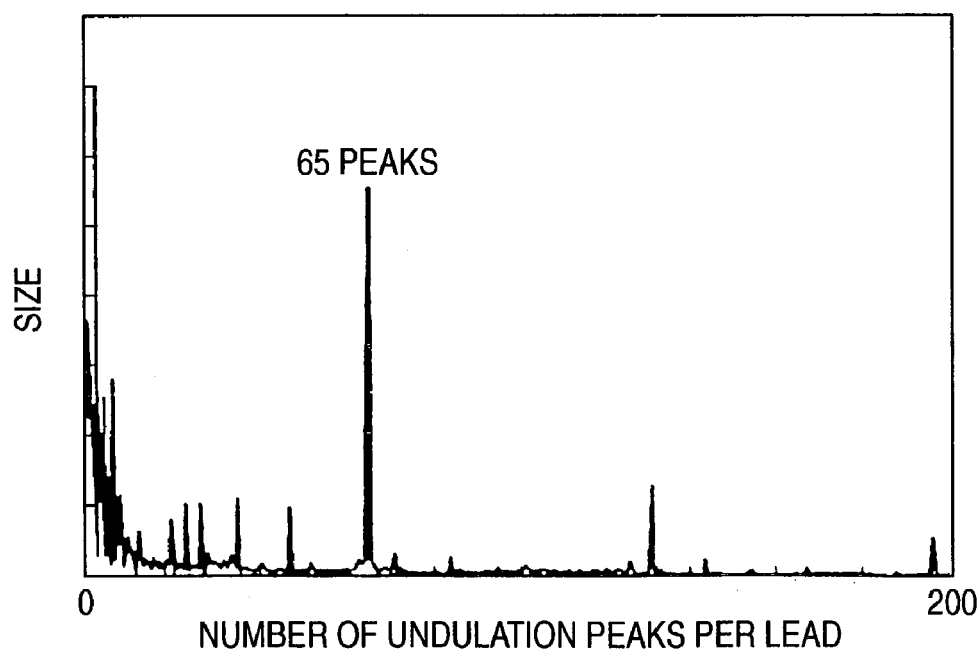
FIG. 2B is a graph showing the number of undulation peaks per lead.

When a spiral ball rolling groove 12 is formed in an outer peripheral surface of a screw shaft 11 of a ball screw by a thread grinding process as shown in FIGS. 1A and 1B, whirling of a grindstone is transferred to the target surface to be machined so that chattering in undulation peaks of the number obtained by dividing the rotational speed $N_G$ of the grindstone by the rotational speed $N_W$ of the workpiece occurs necessarily in one rotation of the workpiece, as shown in FIGS. 2A and 2B.

Assuming now that the rotational speed $N_G$ of the grindstone and the rotational speed $N_W$ of the workpiece are 1300 rpm and 20 rpm respectively, then 65 undulation peaks per lead are produced in the ball rolling groove 12. There is a limit to management to make the chattering of the undulation component small economically.

In the invention, the relation between the rotational speed $N_G$ of the grindstone and the rotational speed $N_W$ of the workpiece at the time of finish-machining is controlled to thereby control the distance between the chattering peaks so that the distance between the undulation peaks is set not to coincide with the distance between the load balls 13 (or a value obtained by dividing the distance by an integer).

That is, the ball rolling groove 12 is ground so that a maximum value component of the number of undulation peaks per lead in the ball rolling groove is not in a range of from 0.95 nm to 1.05 nm centered on an integral multiple nm of the number m of load balls per lead calculated by the expression:

$$\frac{\sqrt{(\pi d_m)^2 + L^2}}{P}$$

in which P is the distance between the centers of adjacent ones of the load balls 13 disposed at substantially equal intervals in the ball rolling groove 12, $d_m$ is a ball pitch circle diameter, and L is a lead.

Specifically, the grinding of the ball rolling groove is performed in such a manner that the ratio of the rotational speed $N_G$ of the grindstone to the rotational speed $N_W$ of the workpiece is selected so that a maximum value component of the number of undulation peaks-per lead in the ball rolling groove 12 is not in a range of from 0.95 nm to 1.05 nm centered on an integral multiple nm of the number m of load balls per lead.

Figure 3:
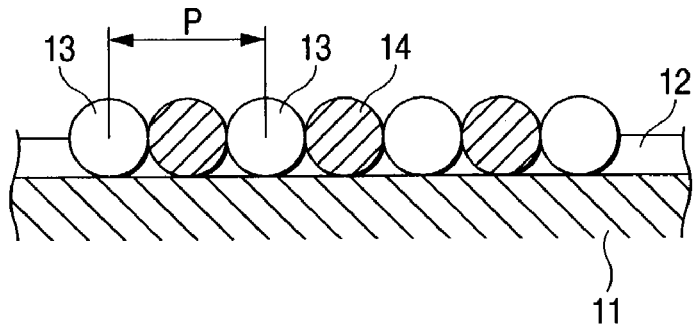
FIG. 3 is a side view showing a state of one-to-one correspondence arrangement of load balls and spacer balls each having a diameter substantially equal to the load ball diameter in this embodiment.
Figure 4:
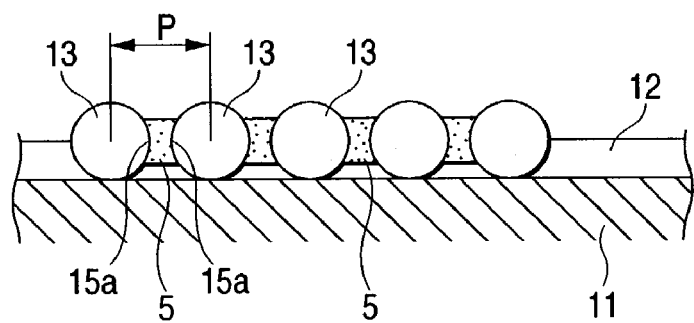
FIG. 4 is a side view showing a state of arrangement of load balls and retaining pieces each of which has concave surfaces facing balls and each of which is interposed between adjacent ones of the load balls in this embodiment.
Figure 5A:
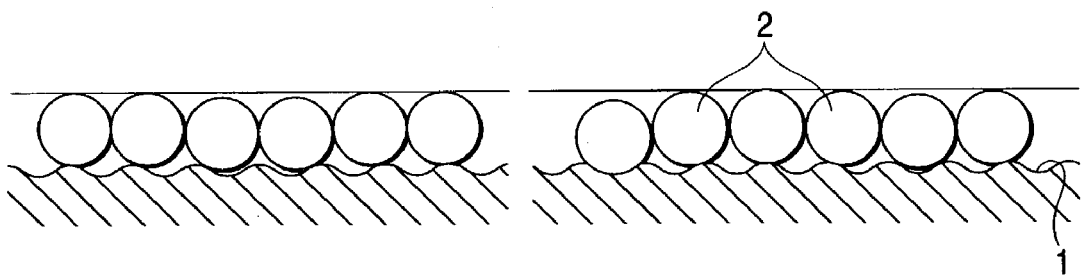
FIG. 5A is a side view showing a state in which the distance of undulation peaks on the ball rolling groove does not coincide with the distance between the load balls.
Figure 5B:
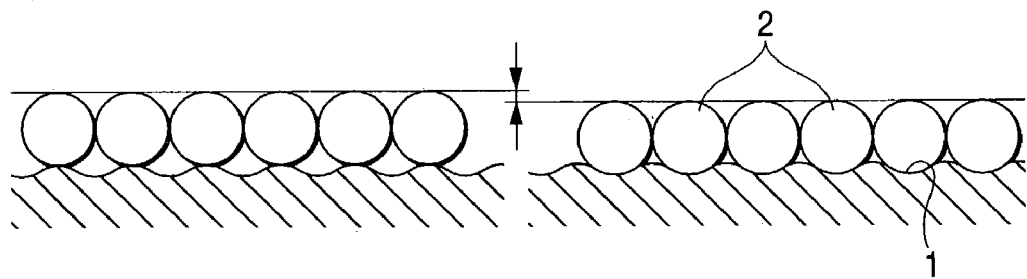
FIG. 5B is a side view showing a state in which the distance of undulation peaks on the ball rolling groove coincides with the distance between the load balls.

In the general specification that all balls used are load balls 13, the distance between the load balls 13 (the distance P between the centers of adjacent ones of the load balls 13) is substantially equal to the diameter of each ball. In the specification that load balls 13 and spacer balls 14 each having a diameter substantially equal to that of each load ball 13 are used in one-to-one correspondence as shown in FIG. 3, the distance P is substantially twice the ball diameter. In the retaining piece specification that a retaining piece 15 having concave surfaces 15a facing load balls 13 are interposed between adjacent ones of the load balls 13 as shown in FIG. 4, the distance P is the distance between the centers of adjacent ones of the balls between which the retaining piece 15 is sandwiched.

Although this embodiment has been described upon the case where the ball rolling groove is provided as a ball rolling groove in the screw shaft, the invention may be also applied to the ball rolling groove formed in the inner peripheral surface of the ball nut.

As described above, according to the invention, the machining condition for finishing the ball rolling groove of at least one of the screw shaft and the ball nut is controlled so that the distance between undulation peaks in the ball rolling groove does not coincides with the distance between the load balls. Hence, the averaging effect of the ball screw is fulfilled. There is therefore an effect that both vibration and noise can be reduced without giving any influence on productivity and production cost.

What is claimed is:

1. A ball screw comprising:
   a screw shaft having a spiral ball rolling groove on an outer peripheral surface thereof;
   a ball nut having a ball rolling groove corresponding to said ball rolling groove of said screw shaft on an inner peripheral surface thereof; and
   balls interposed between said ball rolling groove of said ball nut and said ball rolling groove of said screw shaft so as to roll freely;
   wherein said ball rolling groove of at least one of said screw shaft and said ball nut has a ground surface which satisfies the following relations:

$U_{max} < 0.95(n*m)(n=1, 2, \ldots)$, and $U_{max} > 1.05(n*m)$, where
   $U_{max}$ represents a number of undulation peaks, per lead in the ball rolling groove, having a maximum value,
   m represents a number of load balls per lead, and
   n represents an integer number.

2. The ball screw according to claim 1, wherein the grinding of said ball rolling groove is performed in such a manner that a ratio of a rotational speed $N_G$ of a grindstone with respect to a rotational speed $N_w$ of a workpiece is selected so that $U_{max}$ is not in the range of from 0.95 nm to 1.05 nm centered on the integral multiple nm of said number m of load balls per lead.

3. The ball screw as set forth in claim 2, wherein the ground surface is machined by grinding.

4. The ball screw as set forth in claim 1, wherein the ground surface is machined by grinding.

5. A ball screw comprising:
- a screw shaft having a spiral ball rolling groove on an outer peripheral surface thereof;
- a ball nut having a ball rolling groove corresponding to said ball rolling groove of said screw shaft on an inner peripheral surface thereof;
- balls interposed between said ball rolling groove of said ball nut and said ball rolling groove of said screw shaft so as to roll freely; and
- retaining pieces interposed between said balls;
- wherein said ball rolling groove of at least one of said screw shaft and said ball nut has a ground surface which satisfies the following relations:

$U_{max} < 0.95(n*m)(n=1, 2, \ldots)$, and $U_{max} > 1.05(n*m)$ where $U_{max}$ represents a number of undulation peaks, per lead in the ball rolling groove, having a maximum value, m represents a number of load balls per lead, and n represents integer number.

* * * * *